United States Patent
Meyer

(10) Patent No.: US 12,318,878 B2
(45) Date of Patent: Jun. 3, 2025

(54) METHOD FOR DETERMINING THE POSITION OF A PART IN AN ORTHONORMAL FRAME OF REFERENCE BASED ON A STRUCTURE OF A NUMERICALLY CONTROLLED MACHINE TOOL

(71) Applicant: Universo S.A., La Chaux-de-Fonds (CH)

(72) Inventor: Denis Meyer, La Chaux-de-Fonds (CH)

(73) Assignee: Universo S.A., La Chaux-de-Fonds (CH)

( * ) Notice: Subject to any disclaimer, the term of this patent is extended or adjusted under 35 U.S.C. 154(b) by 189 days.

(21) Appl. No.: 18/173,905

(22) Filed: Feb. 24, 2023

(65) Prior Publication Data
US 2023/0405750 A1    Dec. 21, 2023

(30) Foreign Application Priority Data
May 25, 2022   (EP) ..................................... 22175352

(51) Int. Cl.
  *B23Q 15/12*    (2006.01)
  *B23Q 17/24*    (2006.01)
  *G01B 11/14*    (2006.01)

(52) U.S. Cl.
  CPC ......... *B23Q 15/12* (2013.01); *B23Q 17/2428* (2013.01); *G01B 11/14* (2013.01)

(58) Field of Classification Search
  CPC ..... G01B 11/002; G01B 11/005; G01B 11/24; G01B 11/2518; G01B 21/042;
  (Continued)

(56) References Cited

U.S. PATENT DOCUMENTS

| | | | | |
|---|---|---|---|---|
| 4,841,455 A | * | 6/1989 | Leberl | .................... G01C 11/04 362/23.17 |
| 2005/0071990 A1 | * | 4/2005 | Nakamura | ........ H01L 21/67259 29/721 |

(Continued)

FOREIGN PATENT DOCUMENTS

| | | |
|---|---|---|
| DE | 10 2016 001 337 A1 | 8/2016 |
| JP | 62-124858 A | 6/1987 |

(Continued)

OTHER PUBLICATIONS

European Search Report issued Nov. 9, 2022 in European Application 22175352.8 filed on May 25, 2022, 3 pages (with English Translation of Categories of cited documents).

(Continued)

*Primary Examiner* — Christina A Riddle
(74) *Attorney, Agent, or Firm* — Oblon, McClelland, Maier & Neustadt, L.L.P.

(57) ABSTRACT

A method for determining the position of a part in an orthonormal frame of reference based on a structure of a numerically controlled machine tool to determine the trajectory of a tool for performing an operation on the part, the method including the steps of: holding the part in position on a fixed carrier inside an enclosure of the machine tool, so as to arrange a through-hole comprised in the part such that it faces a through-orifice included in the carrier, the hole opening out in its entirety inside the orifice, illuminating, using a light source, so as to emit light radiation from the carrier towards an optical measuring instrument arranged inside the enclosure of the machine tool, through the hole and the orifice, reading the part using the optical measuring instrument so as to determine the position of the part in the orthonormal frame of reference.

11 Claims, 1 Drawing Sheet

(58) Field of Classification Search
CPC ....... G01B 11/14; G01B 11/026; G01B 11/03; G01B 11/2545; G06T 2207/30164; G06T 7/0004; G06T 7/001; G06T 7/564; G06T 7/74; G06T 7/75; B21D 43/003; B23Q 15/22; B23Q 17/22; B23Q 17/24; B23Q 15/12; B23Q 17/2428; B23Q 17/249; B23Q 17/2457; B23Q 17/2461; B23Q 17/2466; B23Q 17/2233; G05B 19/402; G05B 2219/49113; G05B 19/19; G05B 2219/35349; G05B 19/18; G05B 19/188; G05B 19/195; G05B 19/21; G05B 19/27; G05B 19/29; G05B 19/401; H05K 1/0269; H05K 2201/09063; H05K 2201/09918; H05K 3/0008; H05K 13/02; G06V 10/752
USPC ........................ 356/614–624, 625; 269/289 R
See application file for complete search history.

(56) References Cited

U.S. PATENT DOCUMENTS

| | | |
|---|---|---|
| 2008/0239326 A1 | 10/2008 | Matsumura et al. |
| 2016/0239949 A1 | 8/2016 | Ogawa |
| 2018/0156608 A1 | 6/2018 | McLean et al. |

FOREIGN PATENT DOCUMENTS

| | | |
|---|---|---|
| JP | 2008-246660 A | 10/2008 |
| WO | WO 2017/009615 A1 | 1/2017 |

OTHER PUBLICATIONS

Japanese Office Action issued Apr. 9, 2024 in corresponding Japanese Patent Application No. 2023-032492 (with English translation), 12 pages.

* cited by examiner

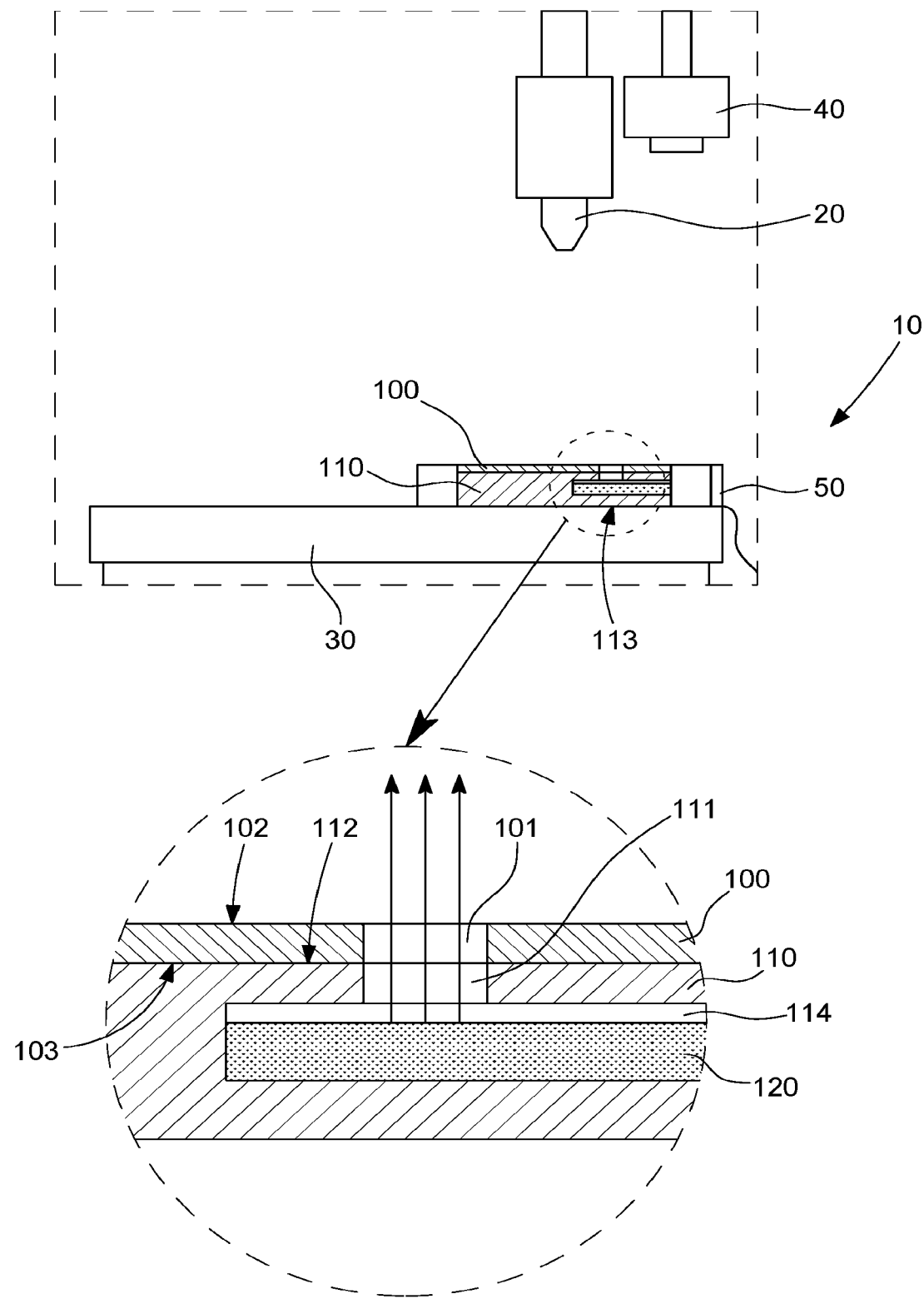

METHOD FOR DETERMINING THE POSITION OF A PART IN AN ORTHONORMAL FRAME OF REFERENCE BASED ON A STRUCTURE OF A NUMERICALLY CONTROLLED MACHINE TOOL

CROSS-REFERENCE TO RELATED APPLICATION

This application claims priority to European Patent Application No. 22175352.8 filed on May 25, 2022, the entire disclosure of which is hereby incorporated herein by reference.

TECHNICAL FIELD OF THE INVENTION

The invention relates to the field of numerically controlled machine tools, and in particular to accessories and toolings for numerically controlled machine tools.

More particularly, the invention relates to a method for determining a part zero point in a numerically controlled machine tool, and to a system for implementing said method.

TECHNOLOGICAL BACKGROUND

A numerically controlled machine tool, hereinafter referred to as a "machine tool", is a machine that is adapted to control the displacement of a tool on the basis of instructions from a control unit, typically a computer, to perform operations on a part fixed inside an enclosure of the machine tool. The operations can consist of removing material, for example machining or polishing, etc., joining operations, such as welding or bonding, etc., or any other operation that can be carried out by an action of a tool on a part.

The instructions are transmitted in the form of a computer program. The tool is displaced from a zero point of a point on the tool intended to act on the part, said zero point being commonly referred to as the "program zero" and being characterised by coordinates in a standardised orthonormal frame of reference based on the structure of the machine. The program zero is defined by an operator.

The displacement of the tool is determined according to the position of the part within said structure, this position being characterised by the coordinates of a so-called "part zero" point.

In order to carry out operations on the part that satisfy strict requirements in terms of precision, the exact position of the program zero and part zero relative to one another must be known.

For this purpose, solutions have been developed that implement optical sensors disposed in enclosures of the machine tools and that are adapted to identify the spatial position of the part zero, and in particular the position of a reference object on the part that defines the part zero, for example an end of an edge or the centre of a hole, etc. These optical sensors transmit the position of the part zero thus measured to the control unit, and the trajectory of the tool can be very accurately determined from the program zero and part zero.

To identify the position of a reference object, optical sensors rely on differences in contrast of an acquired image of the part. In particular, a contrast difference is determined between a surface in the foreground, for example defined by a first face of the part, and a surface in the background, for example defined by a second face of the part or by a face of a carrier of the part. The difference in contrast is caused, for example, by a difference in material or surface finish, etc. between the foreground and background surfaces.

These optical sensors are, however, limited in that they may not recognise certain reference objects in specific circumstances. This is because, when the foreground and background have an insufficient contrast difference to be distinguished from one another by the optical sensors, the latter are likely to make erroneous measurements. These erroneous measurements can lead to the production of parts that do not meet the manufacturing requirements, and can thus cause significant quality issues.

The present invention aims to overcome this drawback and thus to ensure that the position of the part zero is accurately identified in all circumstances, and thus aims to guarantee that the quality requirements for the parts produced as a result of this identification are satisfied.

SUMMARY OF THE INVENTION

The invention resolves the aforementioned drawbacks by providing a solution for identifying the position of a part zero under any circumstances.

To this end, the invention relates to a method for determining the position of a part in an orthonormal frame of reference based on a structure of a numerically controlled machine tool in order to determine the trajectory of a tool for performing an operation on said part.

The method includes the steps of:
holding the part in position on a fixed carrier inside an enclosure of said machine tool, so as to arrange a through-hole comprised in the part such that it faces a through-orifice comprised in the carrier, said hole opening out in its entirety inside said orifice,
illuminating, using a light source, so as to emit light radiation from the carrier towards an optical measuring instrument arranged inside the enclosure of the machine tool, through the hole and the orifice,
reading the part using the optical measuring instrument so as to determine the position of said part in the orthonormal frame of reference.

Advantageously, the method comprises, before the illumination step, a step of integrating the light source into the carrier.

In particular implementations, the invention can further include one or more of the following features, taken alone or according to any combination technically possible.

In particular implementations, the step of integrating the light source into the carrier is followed by a step of electrically connecting the light source by an electrical connection module arranged in the enclosure of the machine tool.

In particular implementations, the hole in the part is arranged coaxially with a through-hole constituted by the orifice in the carrier.

According to another aspect, the present invention further relates to a system for implementing the method described hereinabove.

The system includes a part comprising a through-hole extending from an outer face of the part to an inner face of the part, a carrier comprising a through-orifice extending from an outer face of the carrier. The part is fixed to the carrier such that its inner face is arranged against the outer face of said carrier and such that the hole opens out in its entirety inside said orifice. The system further includes a light source fixed to the carrier so as to emit light radiation through said hole and orifice to an optical measuring instrument.

In particular embodiments, the invention can further include one or more of the following features, taken alone or according to any combination technically possible.

In particular embodiments, the orifice is constituted by a hole with which the through-hole in the part is coaxially arranged.

In particular embodiments, the light source can be removed from the carrier.

In particular embodiments, the light source is arranged in a cavity in the carrier into which the orifice opens out.

In particular embodiments, the system comprises an electrical connection module configured to power the light source with electricity when the carrier is fixed to a structural element of the machine tool.

In particular embodiments, the light source includes a diffusing element for diffusing the light through the hole and orifice.

BRIEF DESCRIPTION OF THE FIGURES

Other features and advantages of the invention will become apparent upon reading the following detailed description given by way of a non-limiting example, and with reference to the accompanying drawings, in which:

FIG. 1 diagrammatically shows an enclosure of a numerically controlled machine tool in which a system for implementing the method according to the invention is illustrated, as well as a detailed view of a part of the system.

It should be noted that the figures are not necessarily drawn to scale for clarity purposes.

DETAILED DESCRIPTION OF THE INVENTION

The present invention relates to a method for determining the position of a part 100, and more specifically of a reference object of said part 100, in an orthonormal frame of reference based on a structure of a machine tool. Determining the position of a reference object of said part 100 allows the trajectory of a tool 20 for performing an operation on said part 100 to be determined.

The present invention further relates to a system 10 for implementing this method.

In example implementations of the present invention, the operation to be performed on the part 100 can consist of removing material, for example machining or polishing, etc., joining operations, such as welding or bonding, etc., or any operation in which a tool 20 is displaced along a predetermined trajectory to act on a part 100. This part 100 can be formed by a rough part or a semi-finished part, etc.

Moreover, it should be noted that not all the components of a machine tool are described herein insofar as they are well known to a person skilled in the art.

The method according to the present invention includes a first step of holding in position the part 100 on which the tool 20 of the machine tool is intended to perform an operation. The part 100 is held in position by removing all of its degrees of freedom.

This part 100 is held in position on a carrier 110 fixed inside an enclosure of said machine tool, so as to arrange a through-hole 101 comprised in the part 100 such that it faces a through-orifice 111 comprised in the carrier 110. Advantageously, the hole 101 opens out in its entirety inside said orifice 111, i.e. the entire surface of the cross-section thereof opens out into said orifice 111.

As shown in FIG. 1, the hole 101 extends from an outer face 102 of the part 100 to an inner face 103 of the part 100.

The term "hole" is used herein to define a cylindrical opening, preferably with a circular cross-section.

In the example implementation shown in FIG. 1, the part 100 is fixed to the carrier 110 such that the inner face 103 thereof is arranged to bear against an outer face 112 of said carrier 110. The part 100 is fixed to the carrier 110 by any appropriate means available to a person skilled in the art, so as to ensure that it is held in position.

Moreover, the orifice 111 extends from the outer face 112 of the carrier 110. Preferably, the orifice 111 is constituted by a hole with which the hole 101 in the part 100 is arranged coaxially. This feature allows the part 100 to be precisely arranged relative to the carrier 110.

The carrier 110 can be constituted by a structural element 30 of the machine tool, such as a table, or it can be constituted by an add-on device, fixed to the structural element 30 of the machine tool in an appropriate manner within the capabilities of a person skilled in the art.

In the example shown in FIG. 1, the carrier 110 is an add-on device that is fixed against the structural element 30 of the machine tool, by an inner face 113. The part 100 can be fixed to the add-on device upstream, i.e. before the add-on device is fixed to the structural element 30 of the machine tool, or it can be fixed to the add-on device after the latter has been fixed to the structural element 30.

The method further includes a step of illuminating, using a light source 120, so as to emit light radiation from the carrier 110 towards an optical measuring instrument 40 arranged inside the enclosure of the machine tool, through the hole 101 and the orifice 111. The light radiation is diagrammatically illustrated by arrows shown in the detailed view in FIG. 1.

The optical measuring instrument 40 is configured to acquire, along a given optical axis, for example perpendicular to the outer face 102 of the part 100, an image of the part 100 fixed on the carrier 110, and is configured to identify at least one reference object of the part 100, such as an edge or points on said part 100. Based on this reference object, the trajectory of the tool 20 is determined by a control unit to perform operations on the part 100. In the preferred implementation of the present invention, as shown in FIG. 1, the reference object of the part is the centre of the hole 101.

Such an optical measuring instrument is known per se to a person skilled in the art. It is thus not described in detail herein.

Following the illumination step, the method according to the invention includes a step of reading the part 100, using the optical measuring instrument 40, such that the latter determines the position of said part 100 in the orthonormal frame of reference, based on the recognition of the reference object of the part 100.

Thus, the position of the part 100 relative to the tool 20, and more specifically relative to the position of a point on the tool 20, is determined accurately and resolutely. Indeed, thanks to the illumination step, and in particular thanks to the direction of emission of the light radiation, the reference object of the part 100, and more particularly the hole 101, is easily identifiable because it is highlighted by backlighting.

Thus, the hole 101 can be precisely identified and the position of its centre can be precisely determined. As a result, the displacement of the tool 20 to perform operations on the part 100 is precise relative to the position of the centre of the hole 101.

The light source 120 is fixed inside the carrier 110 during an integration step carried out before the illumination step. The integration step is followed by a connection step wherein the light source 120 is connected by an electrical connection module 50 arranged inside the enclosure of the machine tool and connected to an electrical power supply.

The connection module 50 is fixed to the structural element 30 of the machine tool and is connected to an electrical power source. In the example shown in FIG. 1, in which the carrier 110 is an add-on device, the connection is made when the latter is fixed to the structural element 30 of the machine tool, for example by establishing contact between connectors of the connection module 50 with terminals of the light source 120 previously fixed inside the carrier 110.

The light source 120 can include a lighting module (not shown in the FIGURE) coupled to a diffuser, for example made of plastic material, adapted to reflect the light emitted by the lighting module diffusely such that the luminance is uniform. This feature helps to guarantee a high degree of accuracy when identifying the position of the part 100, insofar as it avoids any potential reflection phenomena that could falsify the measurements.

Advantageously, the light source 120 can be removed from the carrier 110, so that it can be removed after the operations have been performed on the part 100 or to perform maintenance operations.

In the preferred example embodiment of the invention, the light source 120 is arranged in a cavity 114 in the carrier 110 into which the orifice 111 opens out. The cavity 114 is thus adapted to receive the light source 120, and more specifically the diffuser, such that it engages therewith.

As shown in FIG. 1, the cavity 114 has an opening that opens out on one side of the carrier 110, allowing the light source 120 to be easily and quickly engaged and optionally removed.

Advantageously, in one example implementation not shown in the FIGURE, the carrier 110 can hold several parts 100 in position, each of which including a hole 101 opening out into the orifice 111 or into an associated orifice 111, each hole 101 constituting a reference object of a part 100.

The present invention can advantageously be applied in the field of micromechanics and in particular in the horological field.

In particular, the tool 20 can be formed by a cutting tool for removing material from the part 100, which can be formed by a hand. More specifically, the present invention can be implemented to produce a sink on the head of the hand, in a manner concentric with the hole 101.

It goes without saying that the invention is not limited to this application and that it could be implemented in any field in which operations must be performed on parts by a tool of a machine tool.

More generally, it should be noted that the implementations and embodiments considered above have been described by way of non-limiting examples, and that other alternatives are thus possible.

The invention claimed is:

1. A method for determining the position of a part in an orthonormal frame of reference based on a structure of a numerically controlled machine tool in order to determine a trajectory of a tool for performing an operation on said part, the method including the steps of:
   holding the part in position on a fixed carrier inside an enclosure of said machine tool, so as to arrange a through-hole comprised in the part such that it faces a through-orifice comprised in the carrier, said through-hole opening out in its entirety inside said through-orifice,
   illuminating, using a light source, so as to emit light radiation from the carrier towards an optical measuring instrument arranged inside the enclosure of the machine tool, through the through-hole and the through-orifice,
   reading the part using the optical measuring instrument so as to determine the position of said part in the orthonormal frame of reference;
   said method comprising, before the illumination step, a step of integrating the light source into a cavity of the carrier.

2. The method according to claim 1, wherein the step of integrating the light source into the carrier is followed by a step of electrically connecting the light source by an electrical connection module arranged in the enclosure of the machine tool.

3. The method according to claim 1, wherein the through-hole in the part is arranged coaxially with a through-hole constituted by the through-orifice in the carrier.

4. A system for implementing the method according to claim 1, wherein the part comprising the through-hole extending from an outer face of the part to an inner face of the part, the carrier comprising the through-orifice extending from an outer face of the carrier, the part being fixed to the carrier such that its inner face is arranged against the outer face of said carrier and such that the through-hole opens out in its entirety inside said through-orifice, the system further including the light source fixed to arranged in the cavity of the carrier so as to emit light radiation through said through-hole and through-orifice to the optical measuring instrument.

5. The system according to claim 4, wherein the through-orifice is constituted by a hole with which the through-hole in the part is coaxially arranged.

6. The system according to claim 4, wherein the light source can be removed from the carrier.

7. The system according to claim 4, wherein the light source is removably arranged in the cavity in the carrier into which the through-orifice opens out.

8. The system according to claim 4, comprising an electrical connection module configured to power the light source with electricity when the carrier is fixed to a structural element of the machine tool.

9. The system according to claim 4, wherein the light source includes a diffusing element for diffusing the light through the through-hole and the through-orifice.

10. The system according to claim 4, wherein the through-hole and the through-orifice have the same width.

11. The method according to claim 1, wherein the through-hole and the through-orifice have the same width.

* * * * *